United States Patent Office
3,477,992
Patented Nov. 11, 1969

3,477,992
POLYOXYMETHYLENE COPOLYMERS
Ernst-Ulrich Köcher, Kuno Wagner, and Wolfgang von der Emden, Leverkusen, and Gerhard Dankert, Cologne-Flittard, Germany, assignors to Farbenfabriken Bayer Aktiengesellschaft, Leverkusen, Germany, a German corporation
No Drawing. Continuation-in-part of application Ser. No. 293,856, July 9, 1963. This application Apr. 29, 1964, Ser. No. 363,602
Claims priority, application Germany Aug. 3, 1962
Int. Cl. C08g 23/00, 1/12
U.S. Cl. 260—67
13 Claims

ABSTRACT OF THE DISCLOSURE

Copolymers of high thermal stability whose recurring units include —O—CH₂— groups and

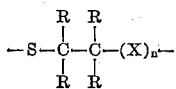

wherein R is hydrogen, lower alkyl or halo lower alkyl, X is —CH₂—, —O—CH₂— and —S—CH₂— and n is an integer from 1 to 3.

Cross-reference to related application

This application is a continuation-in-part of application Ser. No. 293,856 filed July 9, 1963, and now abandoned.

This invention relates to novel copolymers of high thermal stability and particularly to copolymers structurally related to polyoxymethylene and to a method of preparing these copolymers, in which formaldehyde or its oligomers, for example, trioxane, are polymerized in the presence of cyclic, organic thio compounds.

Many methods are known for converting formaldehyde into linear polymers of different chain length. These polyoxymethylenes are readily and quantitatively split into monomeric formaldehyde by heating.

Trioxane, the cyclic trimer of formaldehyde, can also be polymerized in the presence of catalysts, for example, acid, cation-active catalysts and in particular Lewis acids, to form linear polyoxymethylenes, but these polymers are molecularly nonuniform and are also unstable under heat. An important improvement in the thermostability of polyoxymethylenes can be produced by modifying their terminal groups, as already proved about 1930 by H. Staudinger by introducing terminal acetyl groups or methoxy groups. The introduction of terminal alkyl groups is certainly more difficult preparatively than the acylation, but yields products which also have an excellent resistance to alkali because of their pure polyacetal structure as well as the increased thermostability.

Despite these technical advances, such modified polyoxymethylenes show a thermostability which is too low for technical requirements, since acids and oxygen cause a splitting of the polyoxymethylene chains from the centre and this in turn results in a total degradation of the molecules concerned. In order to counteract this disadvantage, two methods have already been proposed. In one case, the influence of oxygen and acids is counteracted by introducing additional stabilizers which exert a degradation-inhibiting action. In the other case, copolymers are prepared from trioxane and cyclic ethers, acetals and lactones, which copolymers not only contain (—CH₂O—) structural units, but also to a lower degree (—CH₂—CH₂—O—)

structural units. Once degradation or breaking down of the chain has started, it comes to a stop at such an ethylene oxide group. In their chemical behaviour, such products are similar to those which are obtained by subsequent terminal group alkylation of polyoxymethylene, i.e. their susceptibility to the action of acid and oxidation influences is invariably high.

It is an object of this invention to provide novel copolymers having the structure of (a) the recurring units —CH₂O— intercalated with groups (b) having the formula

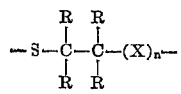

wherein R is selected from the group consisting of hydrogen, a lower alkyl and a lower haloalkyl radical, X is selected from the group consisting of a methylene, a methylene ether and a methylene thioether radical and n is an integer from one to three. The amount of the structure units (a) and (b) in said novel copolymers is in a ratio from about 1:1 to about 1:0.05.

It is a further object of this invention to provide a process for preparing copolymers having the structure relating to polyoxymethylenes with high thermostability. Copolymers of the desired structure may be prepared by polymerizing formaldehyde, trioxane or linear oligomers of formaldehyde together with compounds of the general formula

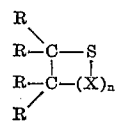

in the presence of cationically active catalysts, for example, Lewis acids.

In this general formula, R represents hydrogen, a lower alkyl radical or a lower haloalkyl radical, X represents a methylene group, a methylene ether group and a methylene thioether group and n is an integer from 0 to 3, and the ring containing only C—S-bonds and C—O-bonds in addition to the carbon-carbon bonds. In the case where X represents a —CH₂— group, n preferably represents an integer from 0 to 2 and in the case where X=—CH₂—S— or —CH₂—O—, n is advantageously 0 or 1. Accordingly, the aforesaid formula includes in particular compounds of the group comprising the cyclic thioethers, thioacetals, dithioacetals, thioketals and dithioketals. The following compounds are to be mentioned as ones which conform to the above general formula: cyclic thioethers such as ethylene sulfide, propylene sulfide and butylene sulfide, tetrahydrothiophene, 1,3-oxythiolane, 2-methyl-1,3-oxy-thiolane, 1,3-dithiolane and 2-methyl-1,3-dithiolane.

1,3-oxthiolanes may be prepared by reacting an alkanolmercapto compound, e.g., mercaptoethanol with formaldehyde in an acid medium. For example, 1,3-oxthiolane is prepared as follows:

390 parts of mercaptoethanol and 153 parts of paraformaldehyde are heated in the presence of 0.05 to 0.5% by weight of a strong acid (mineral acids, sulphonic acid or Lewis acid), calculated on the quantity of mercaptoethanol. Approximately 200 parts by volume of benzene are preferably added and the water of reaction is distilled off azeotropically. The solvent may then be distilled off. The residue is distilled under normal pressure or in vacuo either with the addition of a further 0.2 to 0.5% by weight of acid or after neutralisation of the acid present. The yield is approximately 9% of the theoretical yield. B.P. at 760 mm. Hg=127–129° C., $n_D^2=1.575$. The crude product may be purified by treatment with potassium hydroxide, aluminum hydroxide etc., and dried over metallic sodium.

The quantity of the cyclic, organic thio compounds added is in the range from 0.1 to 50 mol percent, calculated on the formaldehyde introduced, so that the copolymers obtained contain 0.5 to 50 mol percent of the groups corresponding to the organic thio compounds introduced as well as the oxymethylene groups. Thus,

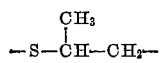

groups are formed when using propylene sulfide and —S—CH$_2$—CH$_2$—O—CH$_2$— groups when using 1,3-oxythiols. As well as using strong acids, such as H$_2$SO$_4$ or HClO$_4$ or alkane-sulfonic acids and p-toluene sulfonic acid as cationically active catalysts, those compounds which are designated as Lewis acids may in particular be used. Examples include boron trifluoride, boron trichloride, aluminium trichloride, ferric chloride, antimony pentachloride, titanium tetrachloride and tin tetrachloride as well as the fluorides of the said metals and the addition compounds of the boron trihalides, in particular of boron trifluoride with ethers, carboxylic acid esters, carboxylic acid anhydrides, amines, nitriles and monocarboxylic or dicarboxylic acid amides, as well as halogen-containing organometallic compounds of aluminium and tin and oxonium salts of Lewis acids, such as triethyl oxonium fluoborate. Fluoborates of aryldiazonium compounds, which change at high temperature into aryl cations with splitting off of nitrogen, are likewise suitable. The catalysts are added to the polymerization medium in quantities from 0.001 to 1% by weight, calculated on the weight of the formaldehyde used.

The formaldehyde can be employed in monomeric form, e.g. as a liquid or dissolved in inert organic solvents such as ether, methylene chloride, n-hexane, benzene, cyclohexane or toluene, or in the form of polymers such as trioxane or linear oligomers of formaldehyde. The choice of the most favorable compounds and combinations under prevailing conditions and also the requirements as regards degree of purity depend, as do also the optimum proportions, very largely on the molecular weight range which is to be produced for the copolymers and the purpose for which they are to be used.

If trioxane is used, the co-polymerization is advantageously carried out as block polymerization, which proceeds within a short time and with almost quantitative yield. In this case, the catalyst is melted with the trioxane and the comonomer is added simultaneously. The trioxane may also first be melted with the comonomer and the catalyst. If desired in an inert solvent, then introduced. The polymerization can however also be carried out in suspension in an organic liquid, in which trioxane has only limited solubility. Suitable organic liquids include, for example, aliphatic hydrocarbons with more than 6 carbon atoms or mixtures thereof (p.e. Mepasin).

If the polymerization is carried out as solution polymerization, the following solvents may be used: benzene, toluene, hexane, heptane, cyclohexane, white spirit and chlorinated hydrocarbons. Polymerization is carried out at a temperature between +25 and 110° C.

On being heated, the copolymers undergo a certain degree of degradation before they reach their maximum stability. This degradation reaction can be accelerated by heating the crude polymer in an inert solvent as well as in alcohols which form semiacetals with the degraded formaldehyde. In order to promote this reaction, organic or inorganic bases are preferably added, which bases simultaneously destroy the polymerization catalyst.

The copolymers obtained melt in the range from room temperature up to 180° C. without becoming discolored. The melting point depends primarily on the proportion of the comonomer units (of the sulfur compound) in the polymer. The smaller the proportion thereof, the higher is the melting point. The influence of the average molecular weight on the melting point, is however, less marked.

Depending on the intended use, it is possible to produce copolymers of a varying molecular weight range. For being used as a thermoplastic material for the production of moulded elements by the injection moulding process or the production of fibers by the melt-spinning or dry spinning processes, copolymers of high molecular weight are suitable, of which the reduced viscosity is in the range from about 0.4 to 2.0, measured at 150° C. in a 0.5% butyrolactone solution. For the production of such copolymers, the quantity of the organic thio compound introduced is advantageously 0.5 to 25 mol percent, calculated on the formaldehyde used (considered as CH$_2$O). Light stabilizers, dyestuffs, pigments, fillers or plasticizers can, for example, be added to these polymers. The copolymers are substantially water-insoluble and possess a considerable toughness, a good stiffness retention when wet, a good tensile strength and flexural strength, an excellent solvent resistance and a good thermal stability. These copolymers are useful for the production of fibers, filaments, bristles and biaxially oriented films and can be extruded as tubing, pipe, sheet and rod. If it is intended that the copolymers should be used as intermediate products or auxiliaries in the synthetic plastics field, lower molecular weights down to about 500 may also be desired. In this case higher proportions of the sulfur-containing comonomer up to about 50 mol percent, based on monomeric formaldehyde, are used. The copolymers which are obtained can in this case have an oily or resinous consistency at room temperature. On increasing the proportion of formaldehyde, the crystallinity of the copolymers increases and the melting point rises.

By the use of other comonomers, for example, cationically polymerizable, cyclic organic oxygen compounds, it is possible for the properties of the copolymers to be further modified. Examples of such compounds include epoxy compounds such as ethylene oxide or propylene oxide and cyclic acetals such as 1,3-dioxolane or diethylene glycol formal. Special copolymers produced according to the process of the invention have a melting point not less than about 150° C. and attain their excellent thermostability only after a brief thermal or chemical treatment, during the course of which a small amount of unstable fractions are broken down which treatment can be effected by heating in substance or in suspension, for example, in high-boiling hydrocarbons, as well as in solution, for example, in dimethyl formamide, butyrolactone, dimethyl sulfoxide, to temperatures between 120 and more than 200° C. The breakdown of unstable fractions can however also be effected by the action of alcohols with up to 6 carbon atoms in the presence of basic compounds. Suitable basic compounds include alkali metal hydroxides and organic bases such as pyridine, tri-n-butylamine, etc. The degradation to the terminal comonomer unit can also be effected by the granulation process. These copolymers have a weight loss not higher than about 2–4% when maintained at about 222° C. for 120 minutes in nitrogen atmosphere, as compared with the homopolymer, having a weight loss under the same conditions of 70–80%.

Example 1

20 parts by weight of trioxane and 20 parts by weight of oxythiolane are melted together and, at 60° C., 0.2 part by weight of boron fluoride etherate (as 10% solution in ether) is added and the mixture heated for 4 hours to 80° C. After 1 hour, the melt shows a strong increase in viscosity. On cooling, the mixture becomes cloudy. The copolymer is then boiled with stirring with 5 times the quantity of 2% methanolic sodium hydroxide solution, then decanted, washed three times with methanol and dried. Yield: 22 parts by weight, melting point 42° C.

Example 12

54 parts by weight of trioxane and 0.2 part by weight of oxthiolane were heated together to a temperature of 70° C., adding 0.5 part by volume of a 1% by weight solution of boron fluoride etherate in ether. The mixture is heated for 12 hours at a temperature of 70° C. The copolymer is washed with methylene chloride. Yield: 51 parts by weight; melting point: 181–183° C.; intrinsic viscosity $\eta_i=0.89$ measured in a 0.5% by weight solution in butyrolactone at 150° C.

The copolymer is then boiled under reflux with stirring for 3 hours with 5 times of quantity of a 5% by weight solution of sodium hydroxide in water. After this treatment 76% of the theoretical quantity of the copolymer were left.

Example 13

500 parts by weight of trioxane and 6 parts by weight of oxthiolane are dispersed under stirring in 500 parts by volume of heptamethylnonan, adding 0.25 part by volume of born trifluoride-etherate. After 10 minutes the emulsion becomes opaque and changes to a suspension. After 5 hours the formed copolymer is sucked off, washed with methylene-chloride and dried. Yield: 432 parts by weight; intrinsic viscosity: 0.85, measured in a 0.5% by weight solution in butyrolactone at a temperature of 150° C. The copolymer is then boiled under reflux with stirring for 5 hours with a 10% by weight solution of N-methyl-diethanolamine in water. The loss of weight is 11%. The resulting copolymer has an intrinsic viscosity $\eta_i=0.87$, measured in a 0.5% by weight solution in butyrolactone at 150° C. The weight loss after 120 minutes at 222° C. is 7%.

Example 14

300 parts by weight of trioxane and 300 parts by volume of a hydrogenated aliphatic hydrocarbon mixture having a boiling point of between 200 to 320° C. were placed in a vessel. 4.5 parts by weight of oxthiolane and 3.7 parts by weight of dioxolane were added. Polymerization was initiated by addition of 8.4 parts by volume of a 2 percent by weight solution of boron fluoride di-butyletherate in the above mentioned hydrocarbon-mixture. Polymerization was carried out at a temperature of between 70 to 85° C. with stirring for 5 hours. The formed copolymer was suction-filtered and washed with methylene chloride and acetone. Yield 260 parts by weight (84.5 percent of theoretical). The catalyst was neutralized by treatment of the copolymer with an aqueous sodium hydroxide solution. The copolymer shows a loss of weight of 2 percent per hour after heating to a temperature of 222° C. The high molecular weight copolymer having an intrinsic viscosity $\eta_i=0.67$ measured in a 0.5 percent by weight solution in butyrolactone at 150° C. yields films at high breaking strength.

Example 15

To an emulsion of 500 g. of trioxane, 4.8 ml. of propylene oxide and 6.5 ml. of 1,3-oxthiolane in 500 ml. heptamethylnonane were added 6.0 ml. of a boron-fluoride-etherate-solution (see Example 1). Polymerization was carried out at a temperature of 70° C. for 6 hours. Yield: 458 g. of copolymer. After the treatment according to Example 1 the copolymer losses at a temperature of 222° C. 0.1 percent by weight per hour. Melting point 164° C.

Example 16

To an emulsion of 500 g. of trioxane, 3.3 ml. of butylenesulfide and 5.5 ml. of dioxolane in 500 ml. heptamethylnonane were added at 70° C. 0.6 ml. of a boron-fluoride-etherate solution. After a reaction time of 5 hours the emulsion changes to a suspension and the temperature rises at 80° C. After suction-filtering and washing with methylene chloride 436 g. of a polymer are obtained having the intrinsic viscosity $\eta_i=0.51$ (measured in a 0.5 percent by weight solution in butyrolacetone at 150° C.). By neutralization and thermal treatment according to Example 4, 32 percent by weight were degraded. The copolymer loses then 0.3 percent by weight per hour at 222° C.

Example 17

Using 6.6 ml. of propylenesulfide instead of butylenesulfide according to Example 16, 115 g. of a polymer, having the intrinsic viscosity $\eta_i=0.45$ (measured in a 0.5 percent by weight solution in butyrolactone at 150° C.) were obtained. The thermostability of the neutralized copolymer is characterized by a loss of weight per hour at 222° C.

We claim:

1. A normally solid copolymer of high thermal stability having repeating units consisting essentially of (a) —O—CH$_2$— groups intercalated with (b)

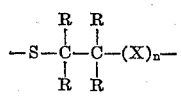

groups wherein R is selected from the group consisting of hydrogen, lower alkyl and halo lower alkyl, X is selected from the group consisting of —CH$_2$—, —O—CH$_2$— and —S—CH$_2$— and $n$ is an integer from 1 to 3, said (a) units constituting 50 to 99.95% of the recurring units and said (b) units being incorporated in said copolymer as essential units thereof, during copolymerization, by ring opening of a cyclic thioether of the formula:

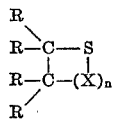

wherein R, X and $n$ are as aforesaid, said formula excluding compounds having sulfur-to-sulfur, oxygen-to-oxygen and oxygen-to-sulfur bonds.

2. The copolymer of claim 1 wherein X is

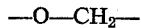

$n$ is 1 and each R is hydrogen.

3. The copolymer of claim 2 wherein said (a) units are incorporated in said copolymer, during copolymerization, by monomeric formaldehyde.

4. The copolymer of claim 2 wherein said (a) units are incorporated in said copolymer, during copolymerization, by trioxane.

5. A highly thermal stable, normally solid copolymer of trioxane and from about 0.1 to about 50 mol percent of a cyclic thioether of the formula:

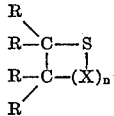

wherein R is selected from the group consisting of hydrogen, lower alkyl and halo lower alkyl, X is selected from the group consisting of —CH$_2$—, —O—CH$_2$— and —S—CH$_2$— and $n$ is an integer from 1 to 3, said formula excluding compounds having sulfur-to-sulfur, oxygen-to-oxygen and oxygen-to-sulfur bonds.

6. A highly thermal stable, normally solid copolymer of monomeric formaldehyde and from about 0.1 to about 50 mol percent of a cyclic thioether of the formula:

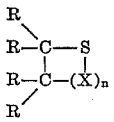

wherein R is selected from the group consisting of hydrogen, lower alkyl and halo lower alkyl, X is selected from the group consisting of —CH$_2$—, —O—CH$_2$—, and —S—CH$_2$— and $n$ is an integer from 1 to 3, said formula excluding compounds having sulfur-to-sulfur, oxygen-to-oxygen and oxygen-to-sulfur bonds.

Example 2

18 parts by weight of trioxane were heated to 70° C. and a mixture of 0.06 part by weight of boron fluoride etherate and 0.06 part by weight of oxythiolane was added. The mixture showed cloudiness after 20 minutes and had solidified after about 2 hours into a thick paste, which was further heated for 5 hours to 60°. The block which was formed was comminuted and boiled under reflux with stirring for 10 hours with 2% methanolic sodium hydroxide solution. After this treatment, 60% of the theoretical quantity of the copolymer were left, this copolymer remaining thermostable after melting. Melting point 149–153° C.

Example 3

As in Example 2, 19 parts by weight of trioxane and 1 part by weight of oxythiolane are copolymerized with 0.06 part by weight of boron fluoride etherate. The polymerization is complete after only 10 minutes. After working up as in Example 2, 13.5 parts by weight of thermostable copolymer with a melting point 164–167° C. are obtained, this copolymer having an intrinsic viscosity of 0.28, measured in butyrolactone at 150° C.

Example 4

39.5 parts by weight of trioxane and 1 part by weight of oxythiolane were copolymerized as in Example 2 in the presence of 0.6 part by volume of a 10% by weight solution of boron fluoride etherate in ether and after-treated. 30.5 parts by weight of thermostable copolymer were obtained, having a melting point thereof of 169–172° C. and an intrinsic viscosity of 0.53, measured in 0.5% solution in butyrolactone at 150° C.

The use of triethyl oxonium fluoborate instead of boron fluoride with equivalent proportions led to the same result.

Example 5

Example 4 was repeated, but in addition 40 parts by volume of a hydrocarbon mixture with 12–18 carbon atoms were used. The mixture was vigorously stirred so that first of all an emulsion was formed, which changed wtih progressive polymerization into a suspension. The polymerization was completed after 4 hours at 70° C., the copolymer was suction-filtered and boiled for 10 hours with methanolic sodium hydroxide solution. The material had the same properties as that obtained in Example 4.

Example 6

39.5 parts by weight of trioxane and 0.5 part by weight of propylene sulfide were polymerized in the presence of 0.3 part by volume of a 10% ethereal solution of boron fluoride etherate 75° C. over 4½ hours. After working up as in Example 2, 16 parts by weight of a thermostable copolymer with a melting point of 162–163° C. were obtained, the intrinsic viscosity thereof being 0.21, measured in butyrolactone at 150° C.

Example 7

15 parts by weight of a polyoxymethylene of relatively high molecular weight and having an intrinsic viscosity of 0.25 (measured in butyrolactone at 150° C. in 0.5% solution) are thermally decomposed and the formaldehyde vapors thus obtained are conducted through 3 U-tubes, which are cooled to −15° C. The formaldehyde which is already relatively anhydrous is thus freed from traces of water, formic acid and other decomposition products from the thermal decomposition by initial polymerization, so that it can be liquified in ether at −60° C. without appreciable polymerization, the highly purified formaldehyde vapors are condensed in a quantity of 10 parts by weight in 80 parts by volume of anhydrous ether at −60° C. 4 parts by volume of 1,3-oxythiolane are then added to the ethereal solution followed by 0.3 part by volume of boron trifluoride ethereate with vigorous stirring. Polymerization starts immediately. After 3 hours, the reaction mixture is heated to room temperature, the white polymer is suction-filtered, extracted by stirring with N/10 methanolic sodium hydroxide solution and then washed with water and acetone and dried at 40° C. in vacuo. Yield: 8.9 parts by weight. The dried polymer is boiled under reflux for 3 hours with 100 parts by volume of methanol and 1 part by volume of N-dimethyl benzylamine, filtered off and washed with methanol and acetone and dried. The copolymer is subjected to a thermal after-treatment by heating for 10 minutes to 180° C. and 4.5 parts by weight of a thermostable polyoxymethylene of high molecular weight, which is free from semiacetal terminal groups and has an intrinsic viscosity of 0.21 (measured in butyrolactone at 150° C. in 0.5% solution), are obtained.

Example 8

25 parts by weight of p-formaldehyde with a water content of 2% are thermally decomposed and the formaldehyde vapors so obtained are conducted through a glass tube with a length of 50 cm. (diameter 1.5 cm.) and purified by initial polymerization, so that the water content of the formaldehyde vapors is still only 0.7–0.9%. The formaldehyde vapors thus purified are introduced at room temperature into 500 parts by volume of methylene chloride which contains 10 parts by weight of 1,3-oxythiolane as copolymerization component and 0.5 part by weight of a stannous salt of 2-ethyl caproic acid and 0.5 part by volume of boron trifluoride etherate as catalysts. The copolymer obtained is filtered off after 3 hours, washed with N/10 methanolic sodium hydroxide solution and then with methanol and acetone and dried at 40° C. in vacuo. Yield: 10 parts by weight.

The polymer is boiled under reflux for 3 hours with 100 parts by volume of N/50 methanolic sodium hydroxide solution, washed and dried and then subjected to a thermal after-treatment by heating for 10 minutes to 180° C. There are obtained 5.5 parts by weight of a thermostable copolymer, which is practically free from semiacetal terminal groups and has an intrinsic viscosity of 0.15 (measured in butyrolactone at 150° C. in 0.5% solution).

Example 9

50 parts by weight of trioxane and 0.33 part by weight of butylene sulfide are heated together at a temperature of 70° C., adding 0.5 part by weight of a 10 percent by weight solution of boron fluoride etherate in ether. The mixture becomes opaque in few minutes and after thirty minutes solid. The mixture is heated for 4 hours to 70° C. The yield of copolymer is 46 parts by weight. Intrinsic viscosity 0.35, measured in a 0.5% by weight solution in butyrolactone at 150° C. The copolymer is boiled three hours with stirring with five times the amount of a 5% aqueous solution of ammonia, then decanted, washed and dried. Thermostability at 220° C. After two hours: 42 percent of weight of the copolymer.

Example 10

Example 9 was repeated but instead of 0.33 part by weight of butylene sulflde 1 part by weight of butylene sulfide was used. Yield: 46 parts by weight of copolymer. Thermostability at 220° C. After two hours: 76 percent by weight of the copolymer.

Example 11

To a mixture of 50 parts by weight of trioxane and 1 part by weight of oxthiolane were added at 65° C. 0.2 part by weight of the complex from boron trifluoride and dimethylformamide. After 10 minutes the mixture becomes opaque, showing an increase in viscosity and after 30 minutes the mixture is solid. The formed copolymer is pulverized and washed with methylene chloride. Yield: 43 parts by weight of copolymer; intrinsic viscosity: 0.27, measured in a 0.5% by weight solution in butyrolactone at 150° C.

7. A highly thermal stable, normally solid copolymer of trioxane and from about 0.1 to about 15 mol percent of 1,3-oxthiolane.

8. A highly thermal stable, normally solid copolymer of formaldehyde and from about 0.1 to about 15 mol percent of 1,3-oxthiolane.

9. A method of preparing a copolymer of high thermal stability which comprises copolymerizing a compound selected from the group consisting of monomeric formaldehyde and trioxane with from about 0.1 to about 50 mol percent of a cyclic thioether of the formula:

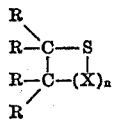

wherein R is selected from the group consisting of hydrogen, lower alkyl and halo lower alkyl, X is selected from the group consisting of —$CH_2$—, —O—$CH_2$— and —S—$CH_2$— and $n$ is an integer from 1 to 3, said formula excluding compounds having sulfur-to-sulfur, oxygen-to-oxygen and oxygen-to-sulfur bonds, in the presence of a catalytic amount of a cationically active Lewis acid.

10. The method of claim 9 wherein trioxane and 1,3-oxthiolane are copolymerized.

11. The method of claim 9 wherein monomeric formaldehyde and 1,3-oxthiolane are copolymerized.

12. The method of claim 9 wherein said catalytic amount is from 0.001 to 1 percent by weight based on the weight of said selected compound.

13. The method of claim 9 wherein said copolymerizing is carried out at a temperature between 25 and 110° C.

References Cited

UNITED STATES PATENTS

| | | | |
|---|---|---|---|
| 3,367,916 | 2/1968 | Von der Emden et al. | 260—67 |
| 2,071,252 | 2/1937 | Carothers | 260—2 |
| 2,475,610 | 7/1949 | Gresham et al. | 260—338 |
| 3,256,246 | 6/1966 | Gutweiler et al. | 260—67 |
| 3,296,206 | 1/1967 | Schott et al. | 260—67 |
| 3,278,489 | 10/1966 | Bernstein et al. | 260—67 |
| 2,457,224 | 12/1948 | Gresham | 260—2 |
| 3,027,352 | 3/1962 | Walling et al. | 260—67 |
| 3,055,874 | 9/1962 | Howard | 260—79 |
| 3,218,300 | 11/1965 | Kullmar et al. | 260—79 |
| 3,000,865 | 9/1961 | Gurgiolo | 260—79 |
| 3,194,788 | 7/1965 | Küllmar et al. | 260—67 |

FOREIGN PATENTS

| | | |
|---|---|---|
| 1,346,542 | 11/1963 | France. |
| 1,271,297 | 7/1961 | France. |

WILLIAM H. SHORT, Primary Examiner

L. M. PHYNES, Assistant Examiner

U.S. Cl. X.R.

260—79